UNITED STATES PATENT OFFICE.

SADAKICHI SATOW, OF SENDAI, JAPAN.

CELLULOID-LIKE SUBSTANCE AND PROCESS OF MAKING THE SAME.

1,280,862. Specification of Letters Patent. Patented Oct. 8, 1918.

No Drawing. Application filed December 30, 1916. Serial No. 139,888.

*To all whom it may concern:*

Be it known that I, SADAKICHI SATOW, a subject of the Emperor of Japan, residing at Sendai, Japan, have made a certain new and useful Invention in Celluloid-Like Substances and Processes of Making the Same, (Case J,) of which the following is a specification.

This invention relates to condensation products of vegetable proteids, and process of making the same.

The object of the invention is to provide a condensation product of hydrolyzed vegetable proteids or proteidal substances, in a form adapting it to be utilized in the manufacture of various commercial products, and an economical and efficient process of manufacturing such product.

In carrying out my invention I employ vegetable proteids or proteidal substances, such as are obtained from suitable proteid containing material, and I hydrolyze such proteids, and, according to the extent to which the hydrolysis is carried, I am enabled to control the properties, both physical and chemical, of the celluloid-like substances produced therefrom.

The hydrolyzed proteids or proteidal substances are subjected to the action of a suitable condensing agent, with or without changing them into their alkali compounds or acid compounds. The resulting product, possessing the desired flexibility, elasticity, strength, hardness and transparency, according to the combinations and relative proportions of the various agents employed, and nature of the treatment to which the product is subjected, is suitable for use in the manufacture of various commercial products.

The proteids or proteidal substances required in carrying out my invention are obtained from any suitable raw material which contains vegetable proteids, such as beans, peas, wheat, corn, or other leguminous, cereal or grain, products.

The proteid containing raw material is crushed to break down the cellular structure thereof, and if the raw material contains an undesirable percentage of oil, the oil content is removed. This may be effected in any suitable manner, as for example, by treating the mass with an oil solvent such as benzin. The oil solvent is then removed from the mass. The proteidal substances contained in the "meal" or "proteid meal" thus produced, are separated therefrom to produce a refined proteid product. This separation of the proteidal substances from the proteid meal may be effected in various ways. According to one method the "meal" is treated with an alkaline solution, such as a dilute solution of caustic or carbonated alkali, or caustic or carbonated ammonia, and the proteidal substances, either with or without further purification of the resulting liquid, are precipitated therefrom. The further purification referred to, may be accomplished by filtration, centrifuging, or the like, by fractional precipitation, fractional solution of precipitated impure proteids, or by converting one or more components into other chemical compounds having different properties which enable their separation to be effected, or one or more of these various purifying methods may be employed in combination with the others. The precipitation of the refined proteidal substances is accomplished by adding a suitable acid, such as sulfuric, sulfurous, acetic or phosphoric, or by adding a suitable ferment, such as lactic or acetic.

According to another method the meal is treated with water and the refined proteidal products are precipitated out of the resulting liquid, either with or without purification thereof being effected with an acid or a ferment, as above described.

According to still another method the meal is treated with an aqueous salt solution, such as sodium chlorid, ammonium sulfate, or the like, and the resulting liquid, either with or without further purification, as explained, is subjected to dialysis.

The proteidal substances, obtained as above described, and whether refined or not, and either in dry powdered form, as wet cakes or in the form of paste, are ready to be subjected to hydrolysis and then to further treatment in accordance with my present invention.

Proteids or proteidal substances possess the characteristic of easily responding to hydrolysis, and the process of hydrolyzing them may be divided into the two general classes of (1) physical and, (2) chemical operations.

Physical hydrolysis of the proteids may be accomplished in various ways; for example, by means of superheated steam, by warming or heating, or by subjecting the proteids to room temperature for a long period of time. Similarly, chemical hydrolysis may be effected by various agents, such as by enzyms, by warming or heating with an alkali, or with an acid, or by exposure to the wet gas of sulfur dioxid, or hydrochloric acid, or by immersing in alcohols.

It is important that in whatever manner hydrolysis of the proteids is effected, the hydrolyzing action should be arrested before complete hydrolysis takes place, and by controlling or varying the degree to which the hydrolyzing action is carried, the physical properties of the final product are controlled.

The hydrolyzed proteids or proteidal substances obtained as above described, are subjected to further treatment in order to prepare them for use in the manufacture of various articles. Such further treatment may be effected through the medium of what I shall call a "reducing agent," intending by this term to include generically a condensing agent alone, or a condensing agent in conjunction with a glutinizing agent, either alkaline or acidic. In the case of treatment with a condensing agent, the hydrolyzed product is kneaded with an organic compound, such as tannin, hexamethylenetetramin, trioxymethylene, aldehydes of aliphatic or aromatic series, or any other active methylene compounds. In the case of treatment with an alkaline agent, the hydrolyzed proteids are kneaded with a dilute alkali or compound which reacts alkaline in solution, such as caustic soda, lime, or sulfids, borates, silicates, carbonates, phosphates, sulfites, formates, acetates, or any organic acid or acid salts of alkali metals or ammonia, or organic bases such as pyridin, urea, glycin, or other amino compounds which react alkaline in solution. In the case of treatment with an acidic agent, the hydrolyzed proteids are kneaded with an inorganic acid, such as phosphoric acid, sulfurous acid, or the like; or with a fatty or oxy-fatty acid, such as formic, acetic, propionic, phenylpropionic, malonic, lactic, tartaric, citric, malic, or the like; or with an aromatic acid, such as salicylic, benzoic, or the like; or a phenol, such as carbolic acid, cresol, resorcin, nitro-cresol, or the like. The resulting mass obtained by treating with alkaline or acidic agents is next subjected to the action of a suitable condensing agent.

The resulting product after treatment of the hydrolyzed proteids or proteidal substances, whether with a condensing agent directly or an alkaline or an acidic agent with a condensing agent, is in condition to be molded or shaped or otherwise made into various articles of commerce, and such product possesses flexibility, tenacity, toughness, resiliency, transparency and elasticity, to an extent depending upon the degree to which the hydrolyzing action is carried, and the nature of the particular agent with which the hydrolyzed proteids are treated.

If desired any desired pigment or coloring matter may be kneaded into the mass.

It is also to be understood that any desired combination of agents may be employed with which to treat the hydrolyzed proteids, and also that the hydrolyzing action and the treatment with the reducing agent to convert the mass into condition for use may be carried on simultaneously.

The following examples will illustrate concrete applications of my invention.

Example 1: Proteids or proteidal substances produced as described, either in powder or paste form, are subjected to the action of superheated steam at about 50 pounds pressure for a period of ten to thirty minutes, and the resulting mass is then kneaded with a suitable reducing agent. The hydrolyzing action of the superheated steam will be greatly facilitated if a small quantity of acid or alkali is mixed with the proteids to be hydrolyzed. This method produces great toughness of the resulting product.

Example 2: The proteids are dissolved in a dilute alkaline solution and the resulting liquid is maintained at a temperature of 50° C. to 60° C. for a period of one half hour to one hour. The hydrolyzed proteids are then precipitated from the solution and are kneaded with a glutinizing agent and next kneaded with a condensing agent. This method results in a product which possesses great plasticity and elasticity.

Example 3: The proteids are maintained in a wet vapor of hydrochloric acid or of sulfurous acid for a period of several hours. The hydrolyzed mass is then kneaded with a reducing agent, as before described. The resulting product possesses a great degree of transparency and flexibility.

Example 4: The wet proteids are mixed with an enzym and the mass is maintained at a moderate temperature for a length of time ranging from six to forty eight hours, depending on the character of enzym employed. The resulting hydrolyzed proteids become a very sticky and plastic mass, which is then subjected to the action of the reducing agent as before described. The final product possesses great plastic properties.

If desired the final product resulting from the treatment of the hydrolyzed proteids with or without a suitable glutinizing agent, may be hardened by immersing the same in a solution of a condensing agent.

Again, if desired, the proteids may be kneaded with a mixture of hydrolyzing and condensing agents, and the resulting mass molded and dried. In this case the hydrolyzing, condensing and drying actions take place in the mass at the same time.

Again, if desired, the condensing agent may be added to a mixture of proteids and a hydrolyzing agent, thereby causing the hydrolyzing and condensing action to take place at the same time, the resulting mass being then molded and dried.

Also, if desired, a suitable viscous plastic material, such as viscose, hydrated or gelatinized cellulose, cellulose derivatives, or the like, as well as any suitable organic or inorganic filling material, such as cotton or other fibrous material, may be incorporated into the mass, according to the nature of the article of commerce to be made from the product.

Having now set forth the object and nature of my invention and various methods of carrying the same into practical operation, what I claim as new and useful, and of my own invention, and desire to secure by Letters Patent is,—

1. In the manufacture of celluloid like substances, the process which consists in hydrolyzing vegetable proteids, and then glutinizing the hydrolyzed product to form a plastic and elastic mass.

2. In the manufacture of celluloid like substances, the process which consists in hydrolyzing vegetable proteids, and then treating the hydrolyzed mass with a reducing agent to glutinize the same into a plastic and elastic condition.

3. In the manufacture of celluloid like substances, the process which consists in hydrolyzing vegetable proteids, and then glutinizing the hydrolyzed mass.

4. In the manufacture of celluloid-like substances, the process which consists in hydrolyzing vegetable proteids and subjecting the hydrolyzed product to the action of a glutinizing agent and an active methylene compound.

5. In the manufacture of celluloid-like substances, the process which consists in subjecting vegetable proteids to hydrolysis and arresting the hydrolyzing action before completion of the same, and then treating the hydrolyzed product with a glutinizing agent to produce a plastic and elastic mass.

6. In the manufacture of celluloid-like substances, the process which consists in subjecting vegetable proteids to hydrolysis chemically, and glutinizing the hydrolyzed product to produce a plastic and elastic mass.

7. In the manufacture of celluloid-like substances, the process which consists in subjecting vegetable proteids to hydrolysis chemically, and glutinizing the hydrolyzed product and treating the glutinized mass with an active methylene compound.

8. In the manufacture of celluloid-like substances, the process which consists in subjecting vegetable proteids to hydrolysis chemically, arresting the hydrolyzing action before completion of the same, and treating the hydrolyzed product with a glutinizing agent to form the same into a plastic and elastic mass.

9. In the manufacture of celluloid-like substances, the process which consists in subjecting vegetable proteids to hydrolysis chemically, arresting the hydrolyzing action before completion of the same, and glutinizing the hydrolyzed product and treating the glutinized mass with an active methylene compound.

10. In the manufacture of celluloid-like substances, the process which consists in subjecting vegetable proteids to hydrolysis and arresting the hydrolyzing action before completion of the same, and glutinizing the hydrolyzed product and subjecting the glutinized mass to the action of an active methylene compound.

11. In the manufacture of celluloid like substances, the process which consists in subjecting vegetable proteids to the action of acid gas to hydrolyze the same, and then glutinizing the resulting hydrolyzed product into a plastic and elastic mass.

12. In the manufacture of celluloid-like substances, the process which consists in subjecting vegetable proteids to the action of acid gas to hydrolyze the same and glutinizing the resulting hydrolyzed product and treating the glutinized mass with a reducing agent.

13. In the manufacture of celluloid-like substances, the process which consists in subjecting vegetable proteids to the action of acid gas to hydrolyze and glutinizing the resulting hydrolyzed product and treating the glutinized mass with an active methylene compound.

14. In the manufacture of celluloid-like substances, the process which consists in subjecting vegetable proteids to the action of acid gas to hydrolyze the same and arresting the operation before complete hydrolysis of the proteids is effected, and glutinizing the resulting product into plastic and elastic condition.

15. In the manufacture of celluloid-like substances, the process which consists in subjecting vegetable proteids to the action of acid gas to hydrolyze the same and arresting the operation before complete hydrolysis of the proteids is effected and glutinizing the resulting mass and treating the glutinized mass with a reducing agent.

16. In the manufacture of celluloid-like substances, the process which consists in subjecting vegetable proteids to the action of acid gas to hydrolyze the same and arresting the operation before complete hydrolysis of the proteids is effected, then glutinizing the hydrolyzed product, and treating the resulting mass with an active methylene compound.

17. The process which consists in subjecting vegetable proteids to the action of a hydrolyzing agent, and then glutinizing the resulting product.

18. The process which consists in subjecting vegetable proteids to the action of a hydrolyzing agent a glutinizing agent and a reducing agent.

19. The process which consists in subjecting vegetable proteids to the action of a hydrolyzing agent a glutinizing agent and an active methylene compound.

20. The process which consists in separating the proteids from vegetable proteid containing material, then hydrolyzing the separated proteids and glutinizing the hydrolyzed product and treating the glutinized mass with a reducing agent.

21. The process which consists in separating the proteids from vegetable proteid containing material, and then treating the separated proteids with a hydrolyzing agent a glutinizing agent and an active methylene compound.

22. The process which consists in separating the proteids from vegetable proteid containing material and purifying the separated proteids, and then subjecting the purified product to the action of a hydrolyzing and a glutinizing agent.

23. As a new article of manufacture a celluloid-like substance consisting of glutinized hydrolyzed vegetable proteids and a condensing agent.

24. As a new article of manufacture a celluloid-like substance consisting of hydrolyzed vegetable proteids and a glutinizing agent.

25. As a new article of manufacture a celluloid-like substance consisting of glutinized hydrolyzed vegetable proteids and an active methylene compound.

26. As a new article of manufacture a celluloid-like substance consisting of hydrolyzed proteids, a viscous material, a fibrous material and a reducing agent.

In testimony whereof I have hereunto set my hand on this 23rd day of December A. D. 1916.

SADAKICHI SATOW.